United States Patent [19]
Clayton

[11] Patent Number: 5,977,533
[45] Date of Patent: Nov. 2, 1999

[54] PULSE WIDTH MODULATED OPTICAL SENSOR INTERFACE CIRCUIT HAVING AN EMITTER CONTROL CIRCUIT

[75] Inventor: Anthony E. Clayton, Stone Mountain, Ga.

[73] Assignee: Panduit Corp., Tinley Park, Ill.

[21] Appl. No.: 09/039,549

[22] Filed: Mar. 16, 1998

[51] Int. Cl.⁶ .................................................. G01J 1/32
[52] U.S. Cl. .................... 250/205; 250/559.42; 355/69
[58] Field of Search ................. 250/205, 208.1, 250/559.42, 559.4, 559.36; 355/69, 68

[56] References Cited

U.S. PATENT DOCUMENTS

| | | | |
|---|---|---|---|
| 3,609,038 | 9/1971 | Kolshorn | 250/205 |
| 4,556,789 | 12/1985 | Shotaro et al. | 250/206 |
| 4,699,531 | 10/1987 | Ulinski, Sr. et al. | 400/74 |
| 4,844,629 | 7/1989 | Hoyt | 400/708 |
| 5,061,946 | 10/1991 | Helmbold et al. | 346/1.1 |
| 5,061,947 | 10/1991 | Morrison et al. | 346/1.1 |
| 5,248,879 | 9/1993 | Turvy, Jr. | 250/205 |
| 5,322,380 | 6/1994 | Crocker | 400/124 |
| 5,335,837 | 8/1994 | Saeki et al. | 400/708 |
| 5,367,154 | 11/1994 | Pfeiffer | 250/208.1 |
| 5,480,244 | 1/1996 | Senda | 400/582 |
| 5,492,423 | 2/1996 | Smith | 400/279 |
| 5,498,087 | 3/1996 | Wey et al. | 400/68 |
| 5,502,298 | 3/1996 | Geller | 250/205 |
| 5,693,931 | 12/1997 | Wade | 250/205 |

*Primary Examiner*—Que T. Le
*Attorney, Agent, or Firm*—Mark D. Hilliard; Robert A. McCann; Michael J. Turgeon

[57] ABSTRACT

An apparatus for accurately positioning a leading edge of a label or detecting a notch in label stock, having, a photosensor with a light emitting element and a light receiving element, and an emitter circuit which uses an oscillating wave form coupled to the light emitting element to control the varying amount of light emitted from the light emitting element.

18 Claims, 4 Drawing Sheets

PULSE WIDTH MODULATED OPTICAL SENSOR INTERFACE CIRCUIT HAVING AN EMITTER CONTROL CIRCUIT

TECHNICAL FIELD

The present invention relates to an optical sensor control interface circuit, and more particularly to a pulse width modulated interface for optical sensor circuits which compensates for variations in sensor characteristics, ambient lighting and label stock reflectivity or transmissivity.

BACKGROUND OF THE INVENTION

Optical sensors are commonly used in the field of printers, hand-held, desk-top or otherwise. Functions of sensors within this field usually include label detection, gap detection, skewness indicator, label length or width determination, etc. Advantages of these devices include their small size and durability. However, as with any device, there are also disadvantages, such as the certain level of sensitivity, precision or tolerance associated with each sensor which can vary greatly, ambient lighting can greatly influence the reception of the light emitted by the sensor, and the characteristics of the print media can vary greatly. The higher the sensitivity, or tighter the tolerance, the higher the cost of the sensor, another disadvantage.

In order to maintain reasonable costs on printers and attain considerable accuracy, prior art devices have tried different methods which use lower-cost sensors to achieve consistent repeatable results. However, sensors get dirty, decay over time, manufacturing techniques vary, and in many other ways the characteristics of each sensor are different or can change over time. Thus, prior art designs which did not precisely account for these variations or changing ambient conditions could not provide consistently reliable results. Other prior art designs offer manual adjustability or self-calibration but with heightened design and manufacturing complexity and greatly increased costs.

An early conventional notch sensor circuit 28 is illustrated in FIG. 2. As now known in the art, the light reflectance of the liner 22 will vary considerably between assorted types of label stock due to differences in material composition, color and manufacturing standards. More particularly, the conventional notch sensor circuit 28 includes a photodiode PD1 and phototransistor PQ1 that may be included in a common package, as described above. An anode terminal of the photodiode PD1 and a collector terminal of the phototransistor PQ1 are each coupled to a voltage source PV+ which provides a direct current voltage, through resistors PR1 and PR4, respectively. A cathode terminal of the photodiode PD1, and an emitter terminal of the phototransistor PQ1 are each coupled to ground. The collector terminal of the phototransistor PQ1 is further coupled to an operational amplifier which functions as a voltage comparator. A reference voltage is established by resistors PR2 and PR3 for the operational amplifier PU1C.

In operation of the notch sensor circuit 28, the voltage potential PV+ applied to the photodiode PD1, causing the photodiode to emit a steady, constant quantity of light determined by the fixed current level. The emitted light is reflected off the label stock as described above, a first portion of the light may be absorbed by the label stock and a second portion of the light impinges upon the phototransistor PQ1. The photo-transistor PQ1 becomes conductive in an amount proportional to the magnitude of light impinging thereon.

The light received by phototransistor PQ1 is converted to a voltage by resistor PR4 and directed to operational amplifier PU1C which functions as a voltage comparator. The voltage representing the light received is compared to a reference voltage which is established when the voltage potential PV+0 is applied to the operational amplifier PU1C through a resistor PR2 which is grounded through PR3. The output of the operational amplifier PU1C is either a high or low voltage representing a digital 1 or 0, respectively.

The accuracy of this output, however, will vary considerably depending on the optical environment, sensor characteristics or label stock composition. For example, if a printer with such a sensor was operated in an area of relatively large amounts of light, a notch edge may not be detected. Since the phototransistor receives a larger amount of light than expected, in relation to the reference voltage, the output corresponds to a value which would indicate that the motor should advance one more step, in other words, that there is no notch edge when one may actually be preset. Likewise, erroneous results occur if the label stock absorbs a considerable amount of the light, or the light output is diminished due to decay of the sensor or poor manufacturing standards.

Another device is cited as prior art in U.S. Pat. No. 5,693,931 to Wade in FIG. 2, which incorporates a potentiometer to permit the amount of current conducted through the phototransistor to be adjusted in order to calibrate the photosensor for differences in ambient light, color, and transmissivity of different materials. However, the adjustment of the potentiometer is a somewhat cumbersome task that is prone to error. Furthermore, the light emitted by the diode is of a steady, constant intensity.

Wade '931 claims a self-calibrating sensor circuit as described in FIG. 4 which does not require manual recalibration to increase or decrease the light output of the photosensor. Rather, the circuit automatically and dynamically calibrates itself for the changing operating conditions and for all types of print media.

A closed-loop control scheme is incorporated whereby an analog-to-digital converter communicates a value to the controller which represents the intensity of the light received by the photosensor. This loop includes a current regulator that controls the fixed amount of current drawn by the light emitting element. A summing junction combines the current from the light emitting and receiving elements and provides a combined current value to the current regulator. In other words, the feedback loop is used to monitor the output of the photoemitter, the reception of the photoreceiver and thereby sum their signals to reset the fixed current input. Wade '931 achieves the goals of automatically adjusting for variations in sensor characteristics and the optical environment much like the present invention, but in a much more complicated and expensive manner. Wade '931 uses more components, which also cost more to manufacture, in addition to the quantity, has more complex manufacturing and assembly and requires a more intricate routing required from the controller.

Another prior art reference worth noting is U.S. Pat. No. 5,248,879 to Turvy, Jr., which discloses another closed-loop control scheme. The output is monitored and used to adjust the control input. This interface uses a digital counter, a low-pass filter, and an amplifier to produce a fixed current through the photodiode, which results in a steady, constant light intensity. Additionally, an analog-to-digital converter is used to communicate a value to the controller which represents the intensity of the light received by the phototransistor. Turvy, Jr. '879 therefore achieves the same goals as Wade '931 in a different manner. However, in a manner more similar to Wade '931, Turvy, Jr. '879 uses more components, which in addition to the quantity, cost more to manufacture, has more complex manufacturing and assembly, and requires a more intricate routing required from the controller.

Thus, is it desirable to provide an apparatus for detecting a notch in a label stock that does not require manual or automatic recalibration to change the light intensity output of the photosensor to compensate for variations in sensor characteristics or the optical environment, and improvement in the art is needed. Such an apparatus should independently compensate for the changing ambient and sensor characteristic operating conditions and for all types of label stock, simply and without expensive and complicated feedback schemes.

SUMMARY OF THE INVENTION

In accordance with the teachings of the present invention, an apparatus for detecting a notch in the label stock is provided. The notch detecting apparatus comprises an electrical circuit that uses a free-running oscillator to produce a varying current or varying light intensity in the photoemitting element and a circuit which receives the light intensity and produces a pulse width modulated digital output whereby the controller can detect a notch based upon a change in the pulse width. Thus, the need for potentiometers or various styles feedback loops to calibrate the photosensor level is eliminated.

The notch edge detection circuit of the present invention comprises a reflective photosensor, and an emitter circuit which produces an oscillating wave form which is coupled to the light emitting element to control the amount of light emitted therefrom.

More particularly, the light emitting element comprises a photodiode, the light receiving element comprises a phototransistor, the emitter circuit further comprises a square wave form oscillator coupled to an operational amplifier, the digital output pulse of the receiver circuit is modulated by changes in the intensity of the light received, and the apparatus is used in combination with a hand-held printer.

A more complete understanding of the pulse width modulated notch sensor circuit will be afforded to those skilled in the art, as well as a realization of additional advantages and objects thereof, by a consideration of the following detailed description of the preferred embodiment. Reference will be made to the appended sheets of drawings which will first be described briefly.

DESCRIPTION OF THE PREFERRED EMBODIMENT

The present invention satisfies the need for an apparatus for accurately and reliably detecting a notch in the label stock of a roll of continuous labels, or positioning the leading edge of a label, that does not require any recalibration features, manual or automatic, to increase or decrease the steady, constant level of light output of the photosensor. The detection circuit of the present invention consistently oscillates the current through the photosensor to vary the light intensity output, thus compensating for changing operating conditions, variations in sensor characteristics, and differences in label stock, by operating independently thereof.

Figure 1:
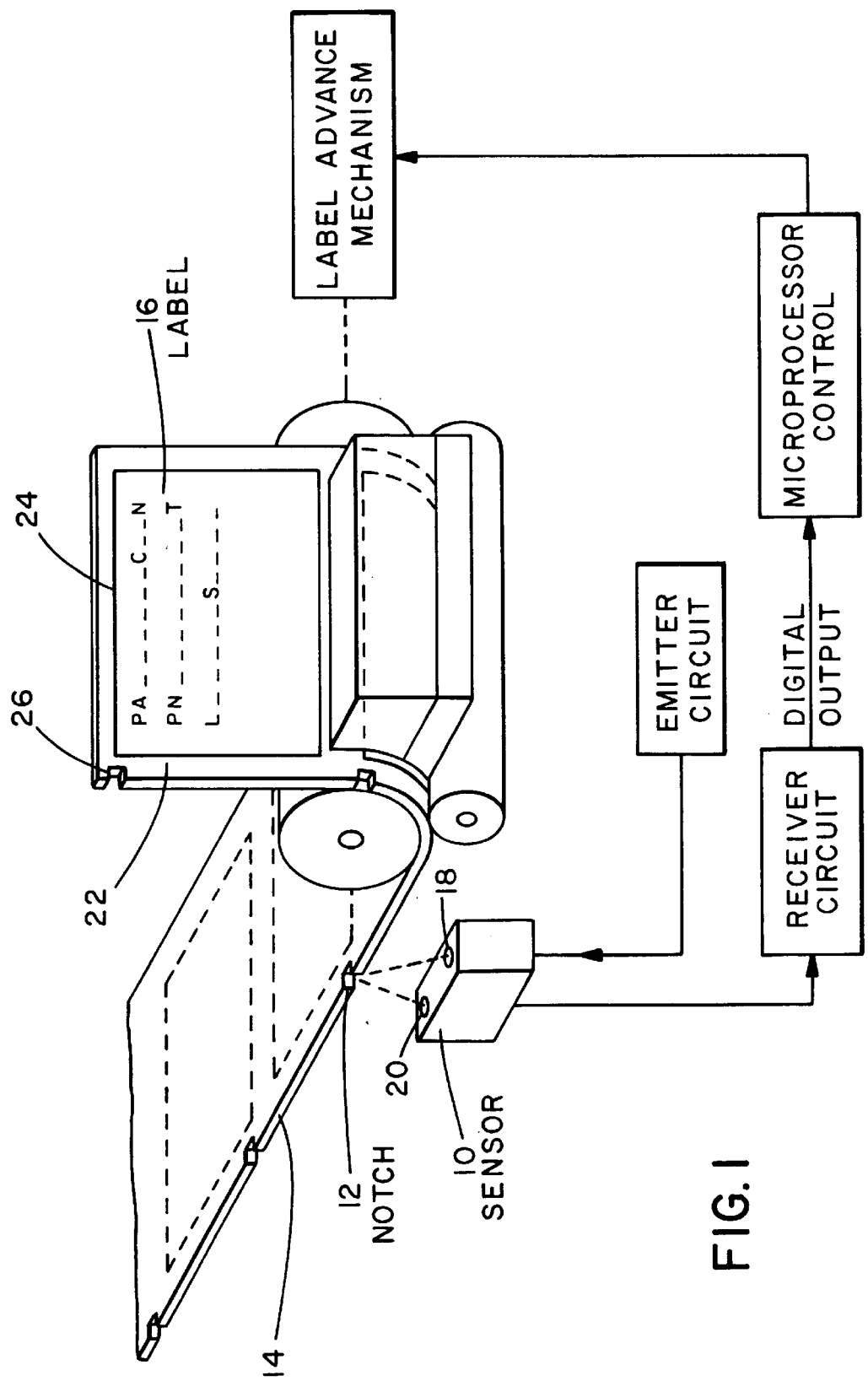
FIG. 1 is a general block diagram illustration showing a sensor circuit made according to this invention and used in a printer environment.
Figure 2:
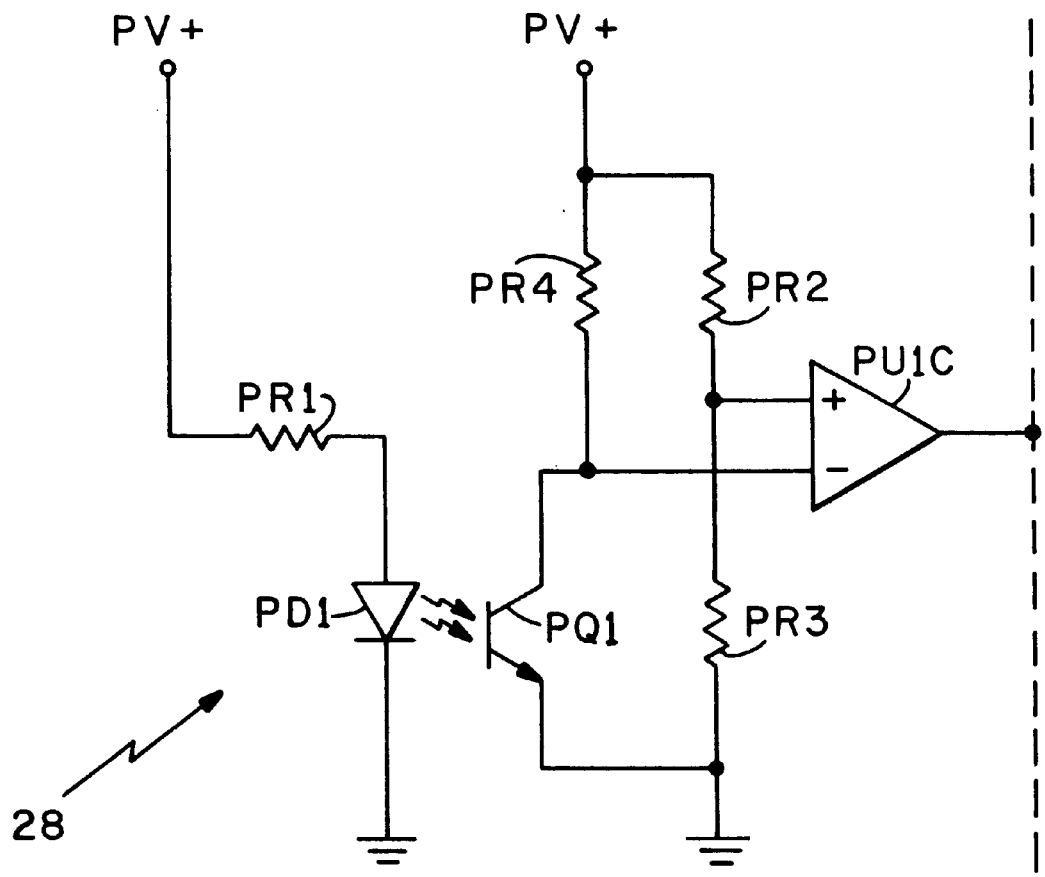
FIG. 2 is a schematic drawing of a conventional notch sensor circuit.

Referring first to FIG. 1, a general block diagram illustrating a circuit used in the printer environment which has a notch sensor 10 to detect a notch 12. The notch sensor 10 includes an integral housing preferably disposed on one side of the label stock 14 on which labels 16 are disposed. Obviously, the sensor 10 position may be reversed or repositioned due to space or alignment considerations.

A first portion of the sensor 10 includes a light emitting element 18, and a second portion of the sensor 10 includes a light receiving element 20. The light emitting element 18 and light receiving element 20 are preferably disposed on the same side of the label stock 14, such as the conventional alignment used for a reflective sensor. However, elements 18 and 20 may be disposed facing each other in an integral housing extending across the label stock or notch from one another. It has been generally found, however, that a reflective sensor is much more compact yielding considerable cost savings.

The light emitting element 18 may be provided by a conventional light emitting diode (LED) or photodiode, and the light receiving element 20 may be provided by a conventional phototransistor. Alternatively, the two elements 18 and 20 may be provided in separate structural housings disposed in proximity to each other, with the light emitting and receiving elements arranged as either of the integral housings described above.

The label stock 14 comprises a liner 22 having an inert surface onto which a plurality of labels 16 are affixed. The labels 16 comprise a paper substrate material having an exposed surface onto which information is printed and an adhesive surface opposite the exposed surface. The adhesive surface permits the labels 16 to remain affixed to the liner as they are transported through the printer in a conventional manner. The labels 16 can be easily removed from the liner 22 after printing, enabling the labels 16 to be permanently affixed to other objects for known identification purposes. Alternatively, network labels, self-laminating cable markers, cloth cable markers, heat shrink markers and component labels may be used in place of generic paper labels.

Notches 12 are disposed substantially equidistantly spaced along the edge of the liner 22. The leading edge 24 of the labels 16 bisects the length of the notch 12. Preferably, the width of each notch 12, or longitudinal length of the notch 12, and the distance between each notch 12, is generally a constant measure. These constant measures may be changed according to the relative label length and spacing required for different types of labels, printers, advancing mechanisms or configurations. The purpose of the notch sensor 10 is to accurately and reliably determine the leading edge 24 of the label 16 so that printing can begin as close as possible to the leading edge 24 of the label 16. Preferably, the first printed line after detecting the leading edge 24 is only one additional step for the advance mechanism.

The liner 22 is generally an opaque material which will reflect substantially all of the light emitted from the sensor 10. Accordingly, the microprocessor control or controller can identify the notch edge 26 by detecting the change in the pulse width of the digital output which is directly related to the modulated changes in the intensity of the light received. The variance in light intensity occurs because not all of the light output from the light emitting element 18 will be received by the light receiving element 20 when the notch edge 26 is positioned above the light emitting element 18.

Figure 3:
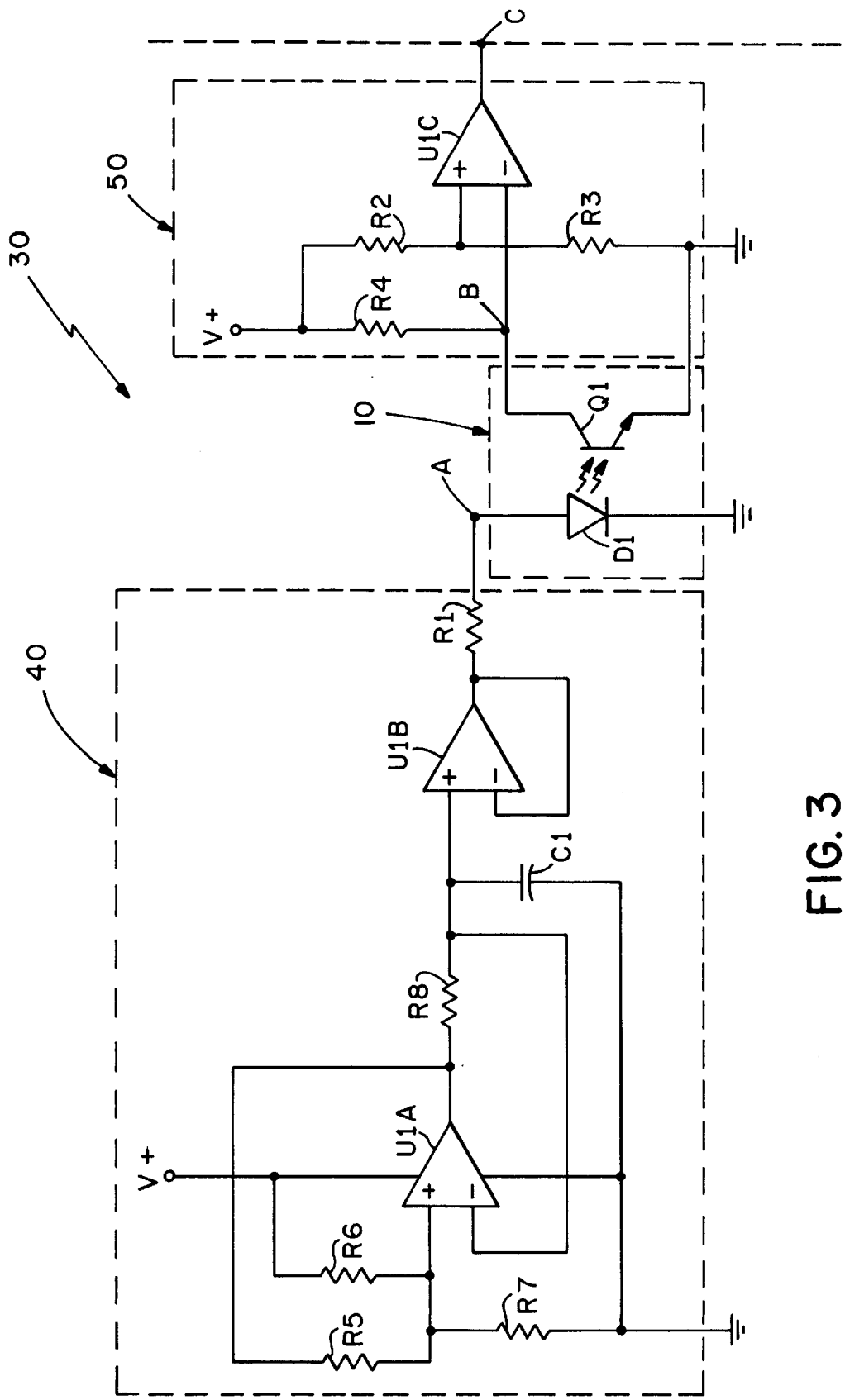
FIG. 3 is a schematic drawing of an embodiment of the notch edge sensor circuit of FIG. 1.

A preferred embodiment of the notch sensor circuit block diagram of FIG. 1 is illustrated in schematic form in FIG. 3 as notch sensor circuit 30. Like many of the conventional notch sensor circuits described above, the notch sensor circuit 30 includes a sensor 10 having a photodiode D1 and a phototransistor Q1. An anode terminal of the photodiode D1 is coupled to a voltage source V+ which provides a direct current (DC) voltage through an emitter circuit 40. A collector terminal of the phototransistor Q1 is coupled to a voltage source V+ which provides a direct current (DC) voltage through a receiver circuit 50. A cathode terminal of the photodiode D1 and an emitter terminal of the phototransistor Q1 are each coupled to ground independently.

Figure 4:
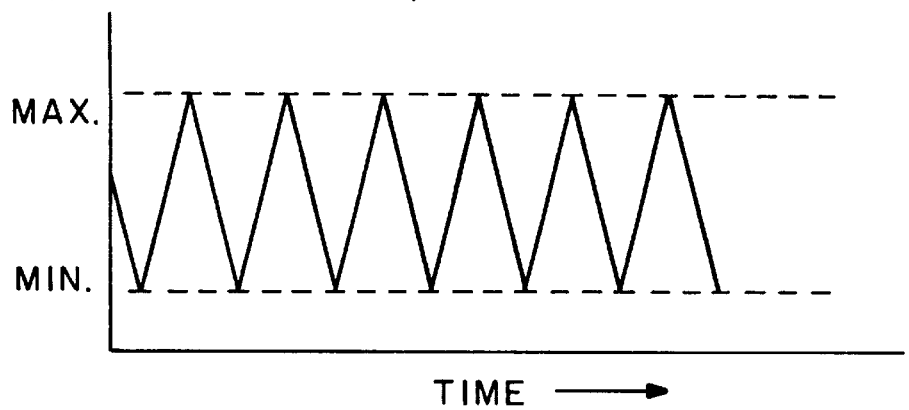
FIG. 4 is a diagram showing the current input or light emitted from the photodiode of FIG. 3.

The emitter circuit 40 is configured to produce at point A, a free-running oscillating ramping wave form as shown in FIG. 4. The wave form represents the current passing through the photodiode D1 and also the actual amount of light intensity emitted by the photodiode D1. In order to achieve this output, an operational amplifier U1A in combination with resistors R5, R6, R7, R8 and capacitor C1 are configured as a conventional, commonly used square wave oscillator. Resistors R6 and R7 establish the nominal trigger level for the operational amplifier U1A, and oscillation is achieved from the positive feedback provided by resistor R5. The amplitude of the operational amplifier output voltage is also controlled by resistor R5. The oscillation frequency is determined by resistor R8 and capacitor C1. As a result, the voltage wave form across capacitor C1 resembles a ramping wave form. Operational amplifier U1B applies the ramping wave form to the photodiode D1 through resistor R1. The resulting light intensity output signal is illustrated in FIG. 4.

The light emitted by the photodiode is reflected off the label stock 14 and the liner 22 as described above, a first portion of the light may be absorbed by the label stock or liner and a second portion of the light impinges upon the phototransistor Q1. The photo-transistor Q1 becomes conductive in an amount proportional to the magnitude of light intensity impinging thereon. Thus, varying constantly.

Figure 5:
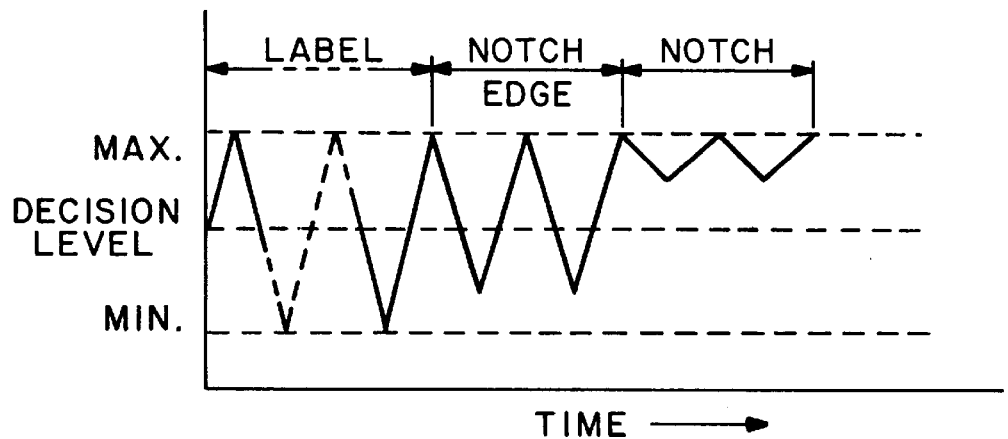
FIG. 5 is a diagram showing the voltage output or light received by the phototransistor of FIG. 3 for the various conditions illustrated.

As shown in FIG. 5, the voltage waveform produced by the phototransistor Q1, at point B, is inversely proportional to the light intensity emitted, as represented by FIG. 4. The maximum voltage level of FIG. 5 represents the minimum or zero light intensity emitted by the photodiode. Likewise, the minimum voltage level of FIG. 5 represents the maximum light intensity emitted by the photodiode. The light received by phototransistor Q1 is converted to a voltage by resistor R4 and directed, at point B, to operational amplifier U1C which functions as a voltage comparator.

When the label stock 14 is disposed above the sensor 10, the phototransistor Q1 receives substantially the entire light wave form produced by the photodiode, thus the label region indicated in FIG. 5 will inversely oscillate from a maximum voltage to a minimum voltage indicating the full range from minimum or no light emitted to maximum light emitted, respectively. However, when the notch edge 26 is disposed over the sensor 10, the full range of light intensity emitted will not be reflected to the phototransistor Q1. As a result, the minimum voltage level, or maximum light intensity emitted, will not be achieved, as shown in the notch edge section of FIG. 5.

The voltage representing the light intensity received is compared to a reference voltage which is established when the voltage source V+ is applied to the operational amplifier U1C through a resistor R2 which is grounded through R3. The output of the operational amplifier U1C, at point C, is a digital pulse, representing a high or low voltage, a 1 or 0, respectively. The digital output pluses are modulated by changes in the intensity of the light received, and correspond in this arrangement to the amount of time the voltage in the receiver circuit remains below the decision level or reference voltage.

Figure 6:
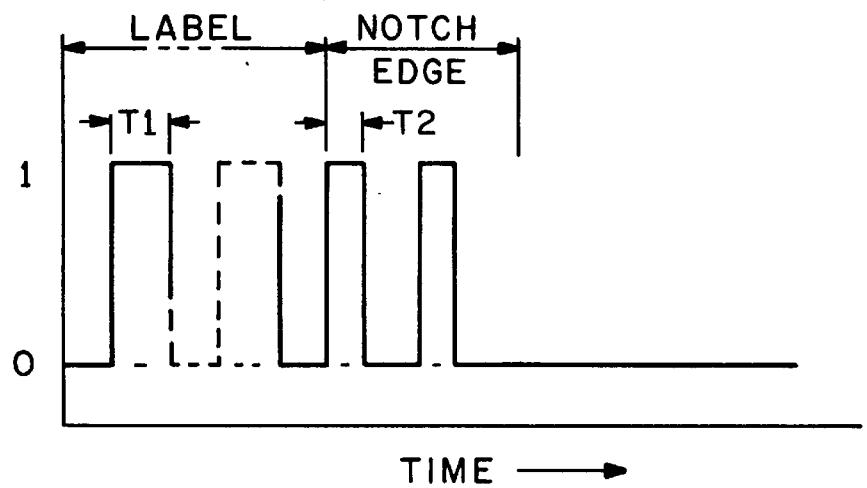
FIG. 6 is a diagram showing the modulated digital output of the various condition of FIG. 5.

The modulations of the digital output representing the light intensity received is represented in FIG. 6. A digital 1 is produced when the light received is below the decision level/reference voltage. The amount of time the light intensity is below the decision level is represented as T1 for the label stock or liner, or T2 for the notch edge in FIG. 6. The digital output pulse is coupled to the microprocessor control or, more commonly, controller in order for the apparatus or printer to find a notch. The controller will continue to advance the label stock in steps until there is a change in the pulse width of the digital output, as can be seen in FIG. 6 between T1 and T2. The printer may begin printing after a predetermined difference in pulse width, between T1 and T2, is achieved, as determined by the microprocessor control.

It should be apparent that the notch sensor circuit of the present invention could also be advantageously utilized with other types of print media besides the label stock described above. For example, one type of alternative print media utilizes a more translucent liner through which a portion of the light emitted may pass, requiring sensor portions on opposite sides. This alternative print media may include a space or gap between the labels without a notch. The notch sensor circuit described above can be configured to recognize this space or gap in the same manner as the notches, as the gap will have a different light transmissive characteristic than the rest of the print media. Moreover, an operator of a printer can change between different types of print media without having to recalibrate the notch sensor circuit. Additionally, the present apparatus may also recognize the difference between the label stock and the leading edge of the label, if a light transmissive label stock is not used.

Having thus described a preferred embodiment of a pulse width modulated notch sensor circuit, it should be apparent to those skilled in the art that certain advantages of the system have been achieved. It should also be appreciated that various modifications, adaptations, and alternative embodiments thereof may be made within the scope and spirit of the present invention.

What is claimed is:

1. An apparatus for accurately positioning a leading edge of a label, comprising:
   a photosensor having a light emitting element and a light receiving element; and
   an emitter circuit which uses a free-running oscillating wave form coupled to the light emitting element to control the varying amount of light emitted from the light emitting element.

2. The apparatus of claim 1, wherein the light emitting element further comprises a photodiode.

3. The apparatus of claim 1, wherein the light receiving element further comprises a phototransistor.

4. The apparatus of claim 1, wherein the emitter circuit further comprises a square wave form oscillator coupled to an operational amplifier.

5. The apparatus of claim 4, wherein the square wave form oscillator further comprises an operational amplifier coupled to a source, a pair of resistors which establish a nominal trigger level, and a resistor which provides positive feedback for oscillation and control of the amplitude of the operational amplifier output voltage, wherein the operational amplifier output is coupled to another resistor and a capacitor for frequency control.

6. The apparatus of claim 1, further comprising a receiver circuit having an operational amplifier which generates a digital output pulse after comparing a voltage input generated by the light receiving element coupled through a resistor corresponding to the intensity of light received, and a reference voltage input.

7. The apparatus of claim 6, wherein the digital output pulse is modulated by changes in the intensity of the received light.

8. The apparatus of claim 6, further comprising a controller which detects a notch based upon a change in width of the digital output pulse, which is modulated by changes in the intensity of the received light.

9. The apparatus of claim 1, wherein the apparatus is used in combination with a hand-held printer.

10. An apparatus for detecting a notch in label stock, comprising:

a photosensor having a light emitting element and a light receiving element; and an emitter circuit which uses a free-running oscillating wave form coupled to the light emitting element to control the varying amount of light emitted from the light emitting element.

11. The apparatus of claim 10, wherein the light emitting element further comprises a photodiode.

12. The apparatus of claim 10, wherein the light receiving element further comprises a phototransistor.

13. The apparatus of claim 10, wherein the emitter circuit further comprises a square wave form oscillator coupled to an operational amplifier.

14. The apparatus of claim 13, wherein the square wave form oscillator further comprises an operational amplifier coupled to a source, a pair of resistors which establish a nominal trigger level, and a resistor which provides positive feedback for oscillation and control of the amplitude of the operational amplifier output voltage, wherein the operational amplifier output is coupled to another resistor and a capacitor for frequency control.

15. The apparatus of claim 10, further comprising a receiver circuit having an operational amplifier which generates a digital output pulse after comparing a voltage input generated by the light receiving element coupled through a resistor corresponding to the intensity of light received, and a reference voltage input.

16. The apparatus of claim 15, wherein the digital output pulse is modulated by changes in the intensity of the received light.

17. The apparatus of claim 15, further comprising a controller which detects a notch based upon a change in width of the digital output pulse, which is modulated by changes in the intensity of the received light.

18. The apparatus of claim 10, wherein the apparatus is used in combination with a hand-held printer to accurately position a leading edge of a label for printing thereon.

\* \* \* \* \*

UNITED STATES PATENT AND TRADEMARK OFFICE
CERTIFICATE OF CORRECTION

PATENT NO : 5,977,533

DATED : November 2, 1999

INVENTOR(S) : Anthony E. Clayvon

It is certified that error appears in the above-identified patent and that said Letters Patent is hereby corrected as shown below:

On the Title Page:
Item [75] Inventor: Anthony E. Clayton should be --Anthony E. Clayvon--.

Signed and Sealed this

Twenty-seventh Day of March, 2001

Attest:

NICHOLAS P. GODICI

Attesting Officer

*Acting Director of the United States Patent and Trademark Office*